July 28, 1970     T. KIRKPATRICK     3,521,683
SAW TABLE WITH COMBINATION INDEX PLATE AND WORK GUIDE
Filed Jan. 12, 1968     3 Sheets-Sheet 2
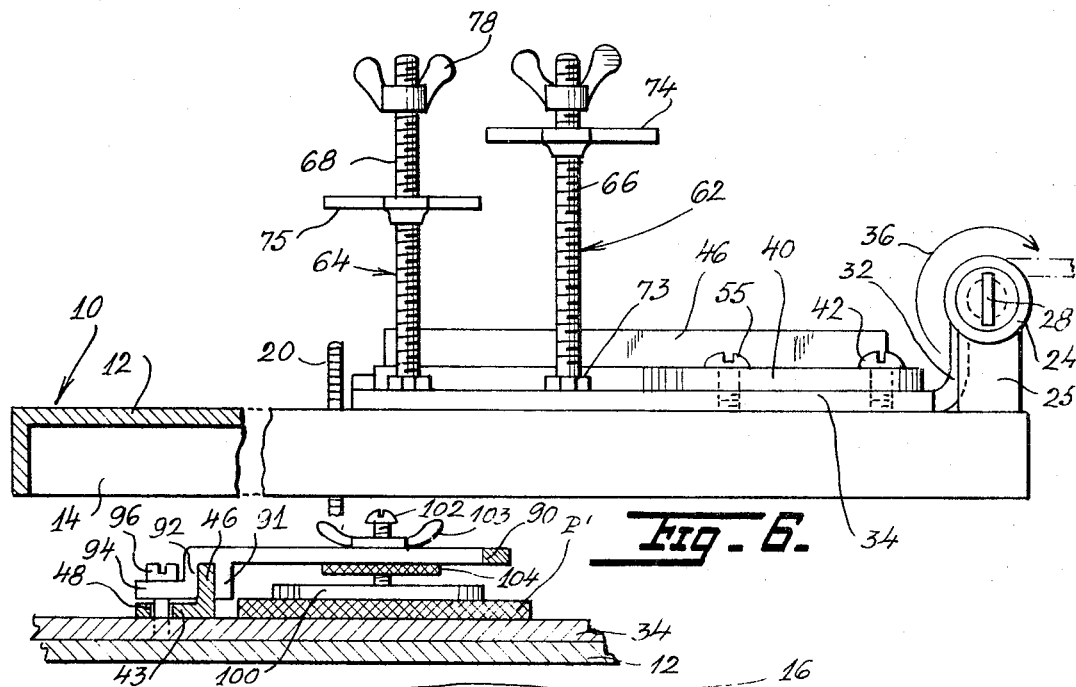
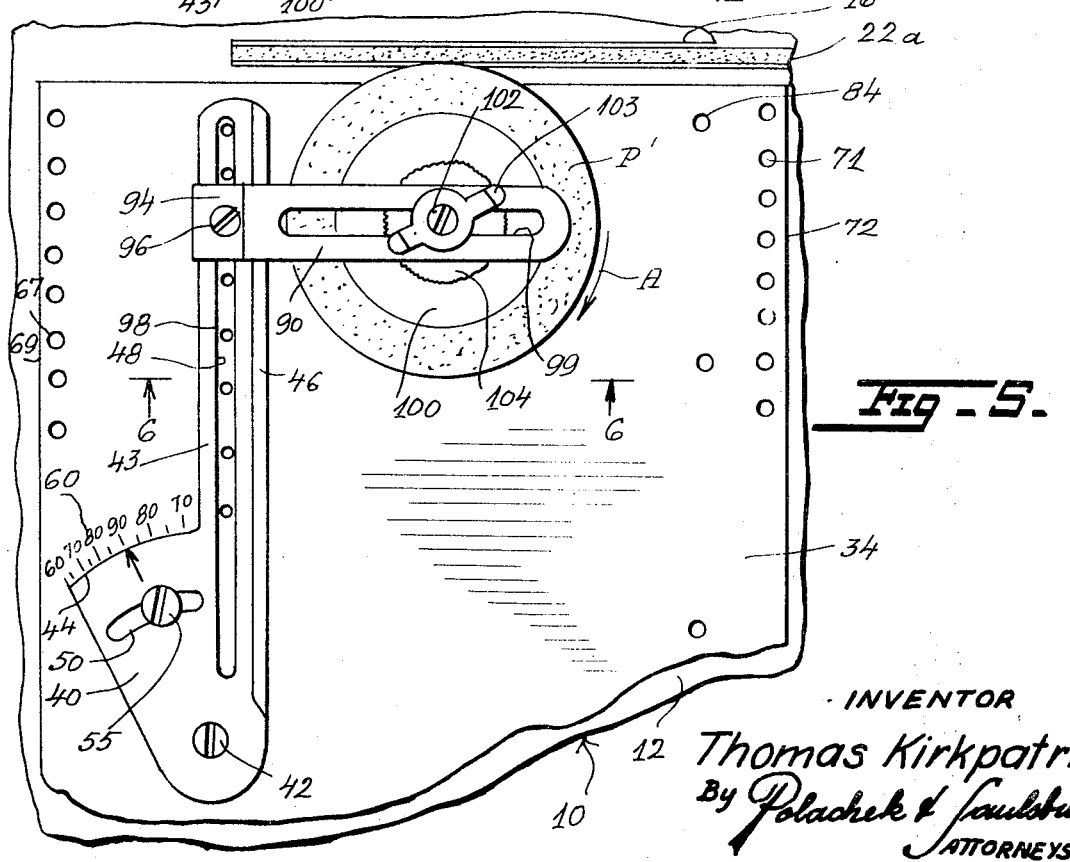
INVENTOR
Thomas Kirkpatrick
By Polachek & Saulsbury
ATTORNEYS

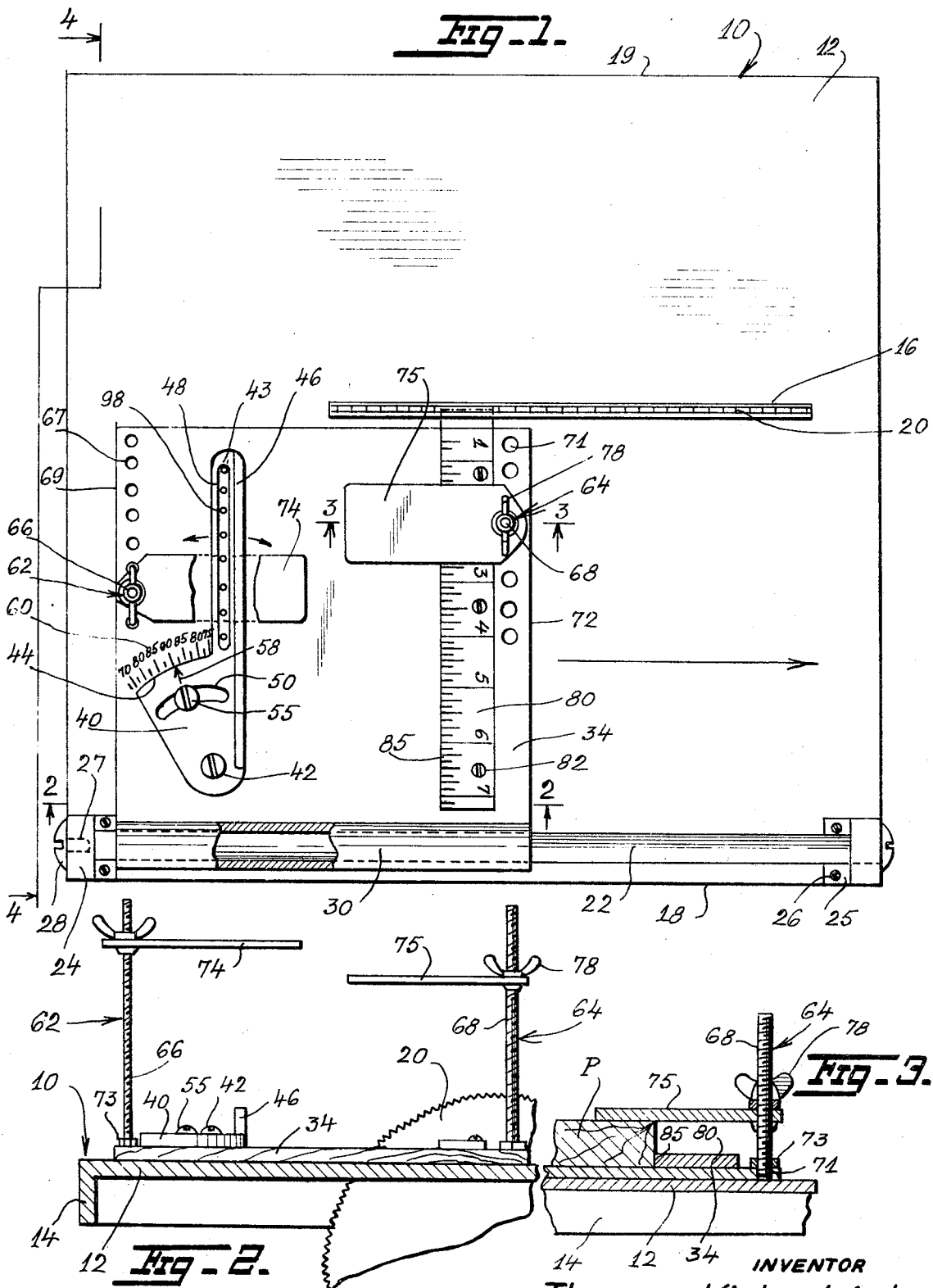

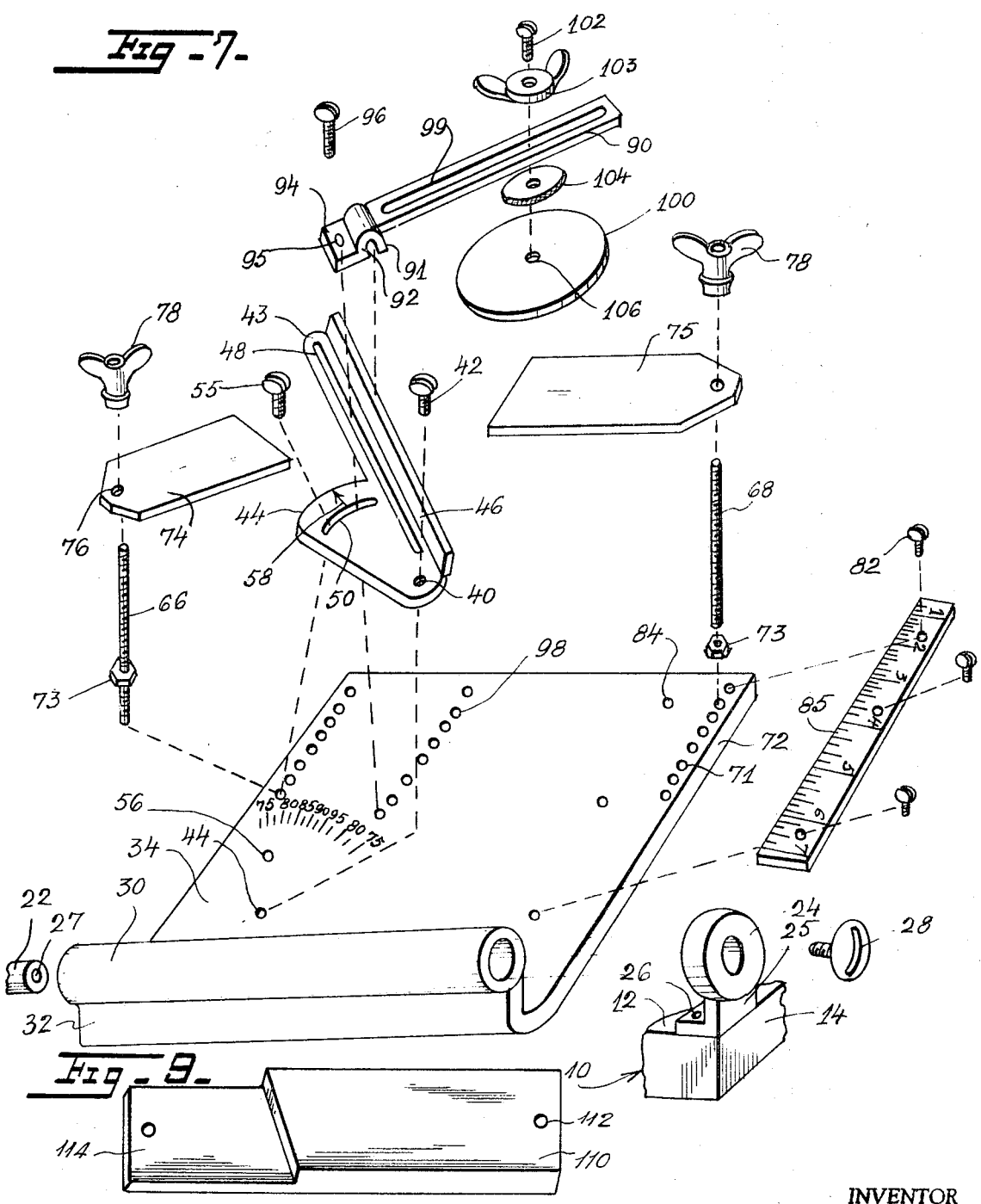

United States Patent Office 3,521,683
Patented July 28, 1970

3,521,683
SAW TABLE WITH COMBINATION INDEX PLATE
AND WORK GUIDE
Thomas Kirkpatrick, 305 E. Houston St.,
Karnes City, Tex. 78118
Filed Jan. 12, 1968, Ser. No. 697,353
Int. Cl. B27b 27/08
U.S. Cl. 143—51                                    7 Claims

ABSTRACT OF THE DISCLOSURE

A rectangular index plate is slidably hinged to a saw table. A protractor arm which serves as a guide for work to be cut is pivotally mounted on the plate. Hold-down clamps for the work are removably mounted on the plate so that the work can be cut at any desired angle to the saw blade. A removable bracket arm and guide for circular workpieces is slidably and adjustably mounted on the protractor arm. The circular guide can be turned for sanding the edges of circular workpieces.

---

This invention concerns a saw table having combination index plate and work guide.

It has been known, heretofore, to provide work guides and work hold-down clamps of various types on saw tables. In such prior devices the work is moved along the guides on the saw table. This requires manual handling of the workpiece during the sawing operation. The positions of the work guides and clamps are fixed relative to and on the saw table.

In the present invention by contrast the work guides and clamps are mounted on a separate movable and removable plate which carries the workpiece. According to the invention, there is provided a saw table with a raised removable rail at one end. An index plate is hinged to the rail and is slidable along the rail while resting on the table. A protractor arm is pivotally mounted on the plate. The arm can be secured in an angular position with respect to a saw blade extending through a slot in the table. A workpiece to be cut out is placed on the plate and is held down by a clamp or clamps mounted on the plate. The workpiece is cut while the plate is moved laterally in its plane parallel to the saw bade. Circular workpieces can be ground smooth by use of an adjustable guide arm which is mounted on the protractor arm. A circular guide plate is rotatably carried by the guide arm. The circular workpiece is disposed under the circular guide plate and placed against a grinding or sanding wheel which is inserted in the saw table in place of the saw blade. Rotation of the circular guide plate effects grinding or sanding of the workpiece.

For further comprehension of the invention and of the objects and advantages thereof, reference will be had to the following description and accompanying drawings, and to the appended claims in which the various novel features of the invention are more particularly set forth.

In the accompanying drawings, forming a material part of this disclosure:

FIG. 1 is a top plan view of a saw table assembly embodying the invention, shown arranged for cutting workpieces by a circular saw blade.

FIGS. 2, 3 and 4 are sectional views taken on line 2—2, 3—3, and 4—4 respectively of FIG. 1.

FIG. 5 is a fragmentary top plan view of the saw table assembly shown arranged for sanding edges of circular workpieces.

FIG. 6 is a fragmentary sectional view taken on line 6—6 of FIG. 5.

FIG. 7 is an exploded perspective view of parts of the saw table.

FIG. 8 is a perspective view of a clamp plate used clamping large irregularly shaped workpieces, and FIG. 9 is an oblique plan view of the clamp plate of FIG. 8 in an inverted position.

Referring to FIGS. 1–7 of the drawing, there is shown a rectangular saw table 10 comprising a rectangular horizontal base plate 12 formed with depending vertical flanges 14 around its four edges to reinforce the table structure. A slot 16 extends transversely of the plate 12 between and parallel to its front and rear edges 18, 19. A saw blade 20 is rotatably mounted in a vertical plane, under the table and extends above the table for cutting workpieces thereon. To the extent described table structure is conventional.

Now in accordance with the invention a cylindrical rail 22 is mounted at the front of the saw table. Opposite ends of the rail are engaged in eyes 24 having integral angle brackets 25 secured by screws 26 opposite front corners of plate 12. Opposite ends of the rail have holes 27, which receive screws 28 to hold the rail in fixed position above table 10.

Slidably and rotatably engaged on rail 22 is a tube or sleeve 30. The tube is integral with upturned flange 32 at the forward end of a rectangular plate 34. By this arrangement the plate 34 can be turned up and around to the front of the table, out of the way as indicated by arrow 36 in FIG. 4. Normally the plate 34 rests on the saw table and slides horizontally along the table transversely parallel to slot 16 and to the plane of the saw blade.

A protractor 40 shaped like a circular segment is pivotally mounted on plate 34, by a screw 42 in a threaded hole 44 in plate 34. The protractor is generally triangular in form and screw 42 is located in hole 41 near the apex of the protractor. The protractor has a radial arm 43 extending from the arcuate edge 44 of the protractor. This arm has an upstanding flange 46 at the right edge of the arm as viewed in FIG. 1. A slot 48 is formed in the arm 43 parallel to flange 46. An arcuate slot 50 is formed in the protractor. This slot is parallel to edge 44 of the protractor. A screw 55 is located at slot 50 and it has a shank extending through the slot and seated in threaded hole 56 in plate 34. Screw 55 can be tightened to locate the protractor and arm in any desired angular position to the saw blade 20. An index mark 58 on the protractor points to graduations in angular degrees of a scale 60 marked on plate 34. In the position shown in FIGS. 1 and 6, index mark 58 points to 90° on scale 60 and indicates that arm 43 is perpendicular to the plane of the saw blade 20. The protractor can be turned angularly to the left or right a maximum of about 15°, and can then be fixed in position by tightening of screw 55.

Hold-down clamps 62 and 64 are provided for workpieces placed on plate 34. Each clamp includes a bolt 66 or 68 threaded for its entire length. One bolt screws into any one of threaded holes 67 set in a row near the left edge 69 of plate 34. The other bolt screws into any one of threaded holes 71 set in a row near the right edge 72 of plate 34. A nut 73 on each bolt serves to lock the bolt securely in a selected hole. Generally rectangular clamp bars on plates 74 and 75 are provided for the clamps. Each clamp plate has a hole 76 near its tapered end 77. The bolts extend through holes 75. Wing nuts 78 are engaged on the bolts and can be tightened to press the clamp plates on a workpiece disposed under the clamp plates. The workpiece will be located in the space between the right face of flange 46 and the right edge 72 of the plate 34. A straight edge ruler 80 is removably secured on plate 34 by screws 82 engaged holes 84 in plate 34. This ruler extends perpendicularly to slot 16 and blade 20. The ruler serves as a guide member for a workpiece mounted on the plate 34 while being cut. In general, a workpiece P to be cut 90° across can be abutted to the left edge 85 of the ruler as shown in FIG. 3 and can be held by clamp 64 while the entire plate 34 with the workpiece mounted to it is moved laterally along rail 22. If a workpiece is to be cut at an angle to the saw blade, then the workpiece will be abutted to the flange 46 after the protractor 40 with arm 43 are turned to the desired angle and screw 45 is tightened. Then clamp 62 will be used to hold the workpiece to the table. Both clamps 62 and 64 will be used together for holding larger workpieces to the table 10. The workpieces can be made of metal, wood, plastic or composition material; or they can be pieces of rock. The table 34, work guides and clamps will handle all such types of cuttable material equally well. While the workpiece is being cut it is not held manually. Only the plate 34 is grasped and moved laterally. This is a safety feature which is very desirable. Furthermore the workpieces are held more securely and cut more uniformly without binding than is possible when workpieces are held by hand and are moved manually into the saw blade.

FIGS. 1–4 show the saw table assembly set up for cutting workpieces by rotary saw blade 20. FIGS. 5 and 6 show the saw table assembly set up for sanding or grinding the edge of a circular workpiece P. For this latter operation, an auxiliary horizontal guide arm 90 is provided. This arm has spaced depending fingers 91, 92 which fit slidably on opposite sides of flange 46. A laterally extending tab or flange 94 is formed at the bottom of finger 91. This tab has a hole 95 which receives a screw 95. The screw can be screwed into any one of a series of holes 98 formed in plate 34 and extending in a row longitudinally parallel to the side edges of plate 34. Arm 90 is spaced above plate 34. It has a slot 99 which extends parallel to slot 16. A rotary disc 100, is rotatably supported by screw 102 which extends through nuts 103 and 104 above and below arm 90 and into a hole 106 at the center of the disc 100. The disc can be moved laterally along slot 99 in arm 90 to any desired position. The disc can be grasped manually and can be turned as indicated by arrow A in FIG. 5. The circular workpiece P' is placed under disc 100. A sanding or grinding wheel 22a replaces the saw blade 22. When the disc 100 is turned the periphery 108 of the workpiece can be ground or sanded by the rotating sanding or grinding wheel 22a which extends through slot 16. The position of the nuts 103, 104 on screw 102 determines the clamping pressure of disc 100 on the workpiece P. The ruler 80 and clamps 62, 64 can be removed for the sanding or grinding operation.

It will be apparent that the table 34, work guides, clamps and associated parts can be mounted to any conventional saw table, or then can be provided as original equipment. No material alternation of the saw table is required. When necessary the plate 34 with work guides, clamps and ruler mounted thereon, can be turned up, around and then down at the front of the tube table to leave the table clear for any other desired work thereon. If necessary the plate 34 and rail 22 can be removed by removing screws 28 at the ends of the rail. The brackets 25 can of course also be removed if necessary.

In FIGS. 8 and 9, there is shown a clamp bar or plate 110 which is especially adapted for clamping large irregularly-shaped workpieces to plate 34. Such workpieces can be rocks, stones, pieces of ceramic and the like. The clamp plate 110 is generally rectangular and is formed with holes 112 near opposite edges which receive both bolts 66 and 68 simultaneously, since the plate 110 has a length substantially equal to the width of plate 34. The underside of plate 110 is formed with a step 114 which extends obliquely across the plate. This step allows for clearance of the protractor 40 in all angular positions when plate 110 is lowered to plate 34. The plate 110 will be mounted on bolts 66, 68 in place of clamp plates 74, 75 and will be held down on the workpiece by wing nuts 78. Plate 110 can be made of hardwood, plastic, or other suitable material.

The entire assembly of plate 34, work guides, clamps and ruler can be supplied as a kit for installation on a saw table. No particular skill is required to install the assembly or to use it after installation. The several parts of the assembly can be fabricated by mass production metal working machinery at relatively low cost.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A work guide and clamp assembly for a flat horizontally saw table having a transverse slot through which a rotary blade disposed in a vertical plane projects comprising; a generally rectangular plate; means for slidably and rotatably mounting said plate to the saw table at its forward edge so that the plate slides in a direction parallel to said slot and blade and rotates in a vertical plane outwardly of the saw table at its front end; a flat indexed partially circular protractor rotatably mounted on the plate, said protractor having an extended radial arm with upstanding flange to serve as a guide for a workpiece on the plate in cutting the same; means for locking the protractor to the plate with the radial arm angular to said slot; clamping assemblies adjustably and removably mounted on the plate for holding the workpiece down on the plate while the plate is moved laterally during cutting of the workpiece by the rotary blade; another arm slidably mounted on the radial arm of the protractor; means for securing said other arm in any one of a plurality of positions spaced from the said slot in the saw table; a rotatable disc disposed under said other arm; means for slidably holding the disc to said other arm; and means for adjustably spacing the disc from said other arm to press down on a circular workpiece under disc, whereby the circular workpiece can be turned by manual turning of the disc for smoothing the periphery of the circular workpiece by said blade.

2. A work guide and clamp assembly as defined by claim 1, wherein the first named means comprises a rail; bracket means on the saw table supporting the rail parallel to and above the front end of the saw table; a flange formed on the plate at one edge adjacent the front end of the saw table; and a tube integral with said flange, said tube being coaxially disposed on said rail so that the plate is slidable longitudinally of the rail and rotatable around the rail.

3. A work guide and clamp assembly as defined by claim 1, wherein each clamping assembly comprises a vertical bolt threaded for its full length; a clamp bar extending horizontally from the bolt and movable along the bolt to bear down on a workpiece on the plate; a wingnut on the bolt for holding the clamp bar on the workpiece; and a nut for locking the bolt to the plate, said plate having two rows of threaded holes near opposite lateral edges for receiving lower ends of the bolts of the clamping assemblies.

4. A work guide and clamp assembly as defined by claim 1, wherein said radial arm of the protractor has a longitudinal slot therein, said plate having a row of threaded holes therein exposable through said longitudinal slot, said other arm having spaced depending fingers slidably engaged with the flange on said radial arm, with a laterally-extending apertured tab overlaying said longitudinal slot; and a screw engaged in one of said threaded holes and holding the tab to the radial arm so that the other arm is supported horizontally above said plate.

5. A work guide and clamp assembly as defined in claim 2, wherein each clamping assembly comprises a vertical bolt threaded for its full length; a clamp bar extending horizontally from the bolt and movable along the bolt to bear down on a workpiece on the plate; a wingnut on the bolt for holding the clamp bar on the workpiece; and a nut for locking the bolt to the plate, said plate having two rows of threaded holes near opposite lateral edges for receiving lower ends of the bolts of the clamping assemblies.

6. A work guide and clamp assembly as defined by claim 5, wherein said radial arm of the protractor has a longitudinal slot therein, said plate having a row of threaded holes therein exposable through said longitudinal slot, said other arm having spaced depending fingers slidably engaged with the flange on said radial arm, with a laterally extending apertured tab overlaying said longitudinal slot; and a screw engaged in one of said threaded holes and holding the tab to the radial arm so that the other arm is supported horizontally above said plate.

7. A work guide and clamp assembly as defined by claim 4, wherein the first named means comprises a rail; bracket means on the saw table supporting the rail parallel to and above the front end of the saw blade; a flange formed on the plate at one edge adjacent the front end of the saw table; and a tube integral with said flange, said tube being coaxially disposed on said rail so that the plate is slidable longitudinally of the rail and rotatable around the rail.

References Cited

UNITED STATES PATENTS

| | | | |
|---|---|---|---|
| 702,043 | 6/1902 | Zika | 143—6 |
| 2,554,730 | 5/1951 | Chandler | 143—52 X |
| 2,660,205 | 11/1953 | Yetter | 143—33 X |
| 2,696,230 | 12/1954 | Libby | 143—26 X |

ANDREW R. JUHASZ, Primary Examiner

JAMES F. COAN, Assistant Examiner

U.S. Cl. X.R.

143—171, 169; 144—21